March 18, 1958  H. J. HERSEY, JR  2,827,128
FILTER WITH MODULATED CLEANING AIR SUPPLY
Filed May 7, 1954  3 Sheets-Sheet 2

INVENTOR.
H. J. HERSEY, JR.
BY James D. Bock
ATTORNEY

March 18, 1958  H. J. HERSEY, JR  2,827,128
FILTER WITH MODULATED CLEANING AIR SUPPLY
Filed May 7, 1954  3 Sheets—Sheet 3

INVENTOR.
H. J. HERSEY, JR.
BY
James D. Bock
ATTORNEY

United States Patent Office 2,827,128
Patented Mar. 18, 1958

2,827,128

FILTER WITH MODULATED CLEANING AIR SUPPLY

Henry J. Hersey, Jr., Chatham, N. J.; The Morristown Trust Company, executor of said Henry J. Hersey, Jr., deceased Application May 7, 1954, Serial No. 428,242

9 Claims. (Cl. 183—61)

The present invention relates to filters for separating dust or fume particles from a gas and it provides control of filter medium density by the use of an automatically modulated counterflow or reverse jet of cleaning air or gas which is directed through the filter medium for the purpose of dislodging a portion of the accumulated particles from the filter medium.

A filter to which this invention may be adapted is disclosed in my Patent No. 2,495,635, dated January 24, 1950, while another filter of the same general type, but of different construction is disclosed in my Patent 2,559,428, dated July 3, 1951.

The principles of the present invention are applicable to filters disclosed in said patents as well as to others embodying the counterflow or reverse jet principle. The counterflow principle is usually embodied in filters wherein a relatively large quantity of cleaning air is forced backwardly through the entire area of the filter medium at once while in reverse jet filters the cleaning air is discharged through an orifice much smaller than the filter medium and which is moved progressively over the medium to clean it by increments. For convenience in the present specification all particles such as dust, smoke fume or droplets of liquid and the like may be referred to as "dust" or "solids" or "particles."

Under continued operation of such filters the layer of particles deposited in or upon the upstream surface of the filter medium will increase in density and thickness causing an increase in the differential in gaseous pressure between the upstream and downstream sides of the filter medium. In said Patent 2,495,635 mechanism responsive to such increase initiates operation of a reverse jet to dislodge at least a portion of the particles from the filter medium to restore the desired porosity. When the differential drops below a predetermined point the pressure-sensitive mechanism will stop the operation of the reverse jet device. Ordinarily the pressure-sensitive mechanism will be set to initiate operation at a predetermined gaseous pressure or differential in pressure and to terminate such operation at a gaseous pressure somewhat lower than that which initiates operation. Under ordinary conditions the reverse jet device will dislodge solids much more rapidly than they are deposited and thus will operate only during a fraction of the total time that the dust filter is in operation. Obviously after each operation of the reverse jet the internal pressure of the filter must rise from the cutoff pressure to the initiation pressure before operation of the reverse jet will be resumed.

Fluctuations in the dust load and other conditions affecting filter operation must be anticipated in nearly all commercial installations. Thus, fluctuations in volume, moisture content, particle size, electrical charge, etc., of the solids and fluctuations in temperature and moisture content of the gas are frequently encountered and make it necessary to provide reverse jet capacity which may be too great for certain conditions if it is adequate for others. This may result in over-cleaning of the filter medium under some conditions, and under-cleaning thereof under other conditions. It is the object of the present invention to avoid such results and thus to provide accurate and automatic control of filter medium density under widely varying conditions.

The avoidance of under-cleaning is necessary with any type of filter medium and dust load if capacity is to be maintained. I have discovered that the avoidance of over-cleaning is of unexpected importance in connection with particular types of filter mediums and dust loads, as will be explained herein.

Woven filter mediums, whether they be wire screens or textiles, will inevitably leak a substantial number of particles when they are clean and first put into operation. After they have been in operation for a time, the particles which are detained will in effect constitute additional strands, wires or nap and will bridge at least some of the openings. Thereafter the filter medium plus the accumulated and bridged particles will be more effective in detaining small particles through the filtration processes of impingement, diffusion and screening. When such layer is so thick or dense as to seriously reduce the capacity of the filter, it is customary to clean the filter medium in some manner. When it is cleaned many of the bridges are destroyed and accumulations are lost so that the cleaned filter medium will permit the escape of a large percentage of particles when it is again placed in use. This is true, although to a lesser extent, of woven textiles which have a nap or are made of fuzzy yarns. For this reason it has not been possible to avoid over-cleaning of a woven filter medium.

In contrast with this there are types of filter mediums which afford exceedingly tortuous passageways. Felt-like filter mediums, such as wool felts, glass wool bats, or paper or paper-like materials afford such passageways between the fibers of which they are formed. Certain other porous structures such as porous metal or porous ceramics afford such passageways between the particles from which they are formed. When a new wool felt, for example, is first put into operation, certain particles may escape completely through the felt but a large percentage of particles of various sizes will penetrate into the felt for varying distances and finally be detained within the tortuous passageways defined between the fibers. After operation with a dust having a large percentage of fine particles for a reasonable period of time, the tortuous passageways therein will have detained sufficient small particles to be quite effectively plugged against the escape of any dust and yet the porosity of the felt will not be too greatly reduced. When a felt has reached this condition its density may be said to be ideal inasmuch as it will retain particles of exceedingly small size and at the same time will permit adequate passage of gas. It is only after the accumulation of deposits of excessive density or thickness that the resistance to the passage of gas becomes such that cleaning is necessary. If at this time an uncontrollable cleaning operation, such as shaking of the filter medium or exposure thereof to a vacuum nozzle, is performed the accumulated layer of particles and a very large percentage of small particles entrapped in the interstices will be removed and the filter medium will be restored approximately into its original density. When put back into operation it will again permit leakage of some of the particles which are smaller than the interstices.

Reverse jet cleaning devices such as disclosed in my Patents 2,495,635 and 2,559,428 aforesaid might be so accurately designed for a particular filter medium of the latter type and dust load of constant characteristics as to remove at least the major portion of the accumulated layer and not too great a portion of the fine particles within the interstices so as to restore desired porosity to gas without so over-cleaning the felt as to cause it to leak exceedingly fine particles. However, such restoration of ideal filter medium density is only theoretically possible under conditions wherein there is no variation in dust load, moisture content, electrical charge, etc.

I have found that filter medium density can be controlled in spite of the variations almost always encountered by providing reverse jet apparatus having variable capacity which may be automatically adjusted to meet the conditions arising from such variations. For example the volume and hence the velocity of the cleaning gas applied to the filter medium by a reverse jet may be automatically varied in accordance with the pressure drop across the filter or the rapidity with which the pressure drop changes so that the reverse jet will restore desired porosity without danger of overcleaning. To this end I provide mechanism which will automatically supply relatively low volume to the jet when such will be effective to restore desired porosity and will apply proportionately higher volume if necessary. In the type of control by pressure described in my U. S. Patent No. 2,559,428, the volume of the reverse jet is constant and this frequently results in overcleaning of a portion of the filter surface.

In the present specification I illustrate a variable speed drive for the blower or compressor which supplies the reverse jet and alternately, an adjustable valve acting as a bleeder. The variable speed drive or the bleeder valve may be adjusted in accordance with the pressure across the filter by automatic operation of a pressure-sensitive device such as a bellows.

Referring now to the drawings in which there are shown preferred but not necessarily the only forms of my invention.

Figure 1:
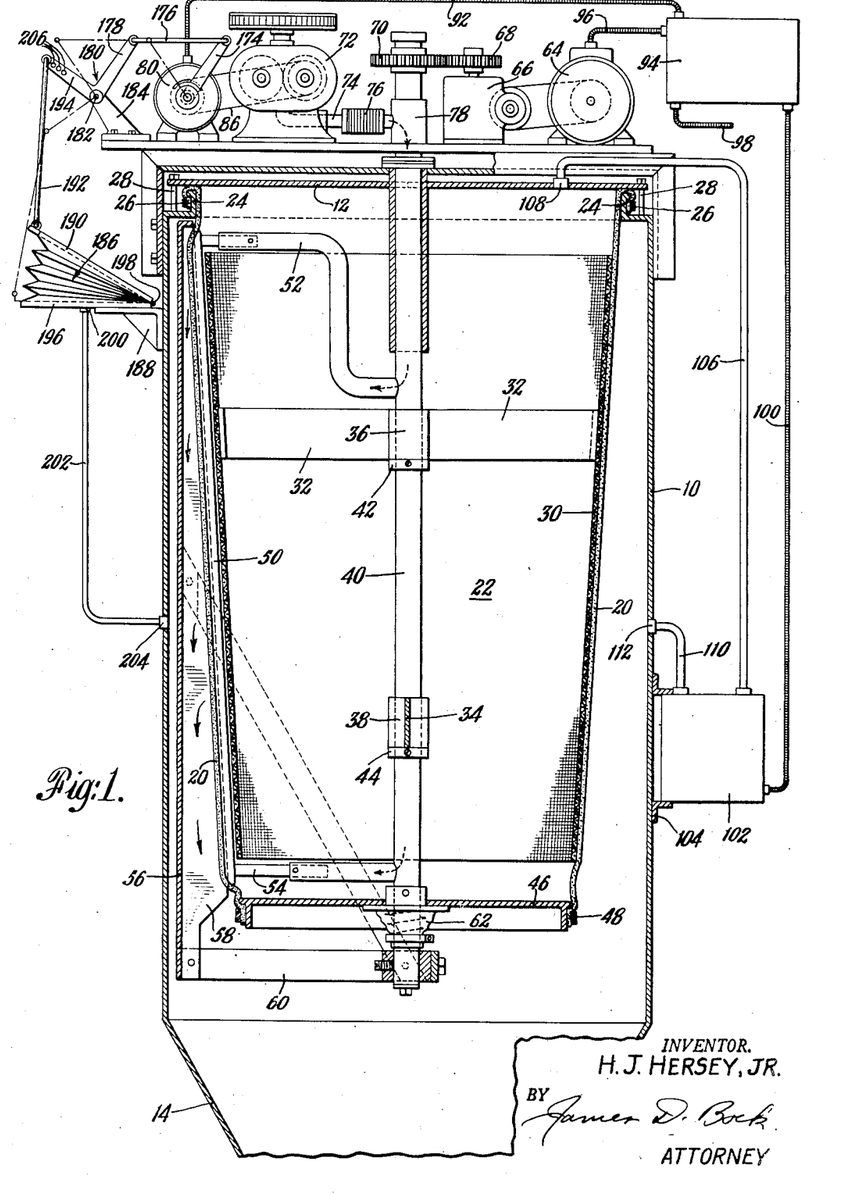
Fig. 1 is a vertical sectional view of a dust filter embodying the present invention.
Figures 2, 3:
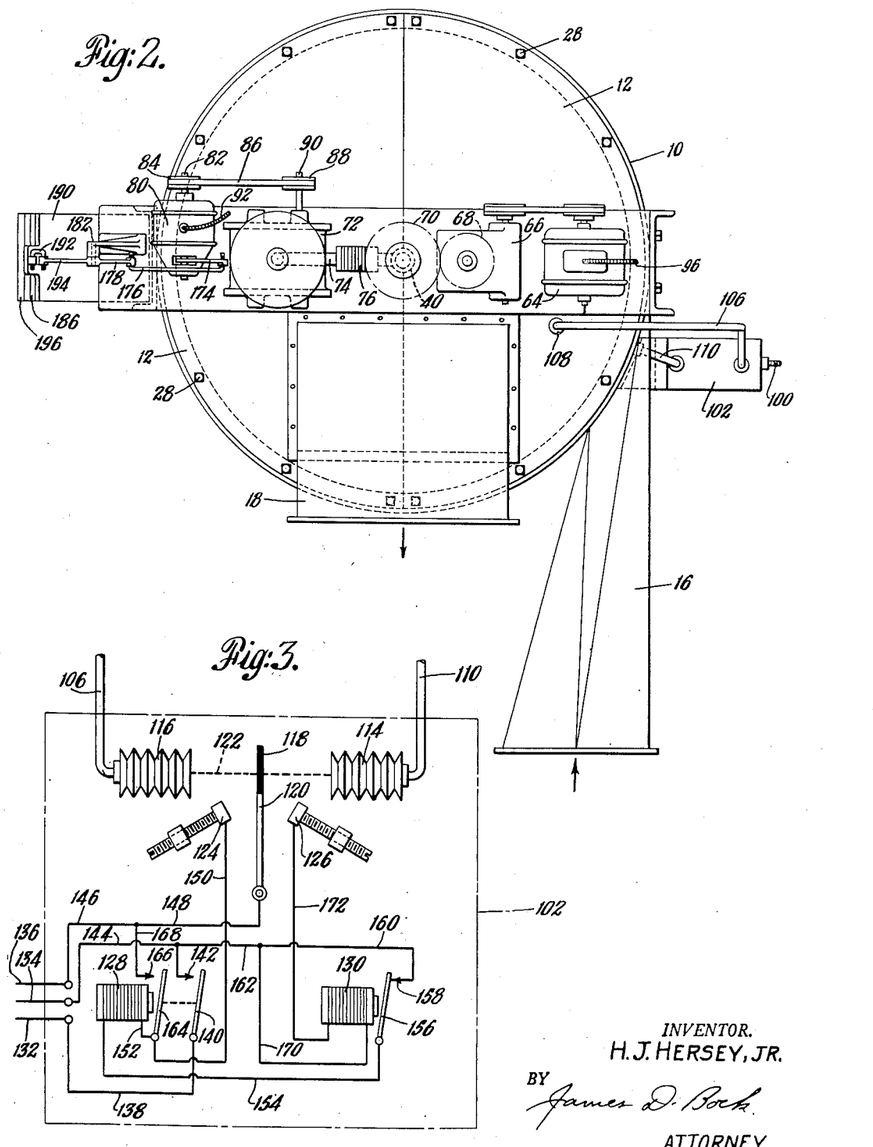
Fig. 2 is a plan view of the same.
Fig. 3 is a diagrammatic view of a pressure sensitive switch which may be used in the present invention.

In the drawings Figs. 1 through 3 show the present invention applied to a filter such as is disclosed in my Patent 2,559,428 aforesaid. In general such filter includes a preferably cylindrical gas-tight enclosure or body 10 closed at the top by a disc 12 and at the bottom by a hopper 14 for the accumulation of solids which may be removed from time to time through a suitable access opening, not shown. Dust laden gas is introduced into the body 10 through a tangentially disposed inlet conduit 16 (see Fig. 2) and after separation of the dust particles therefrom the gas leaves the body 10 through a discharge conduit 18 (see Fig. 2) communicating with the central zone of the filter body 10.

The dust laden gas may be supplied to the filter under gaseous pressure by a suitable blower, not shown, on the inlet side or it may be drawn through the filter by a suitable blower, not shown, on the outlet side.

A filter medium 20 is supported within the body 10. The filter medium 20 is generally cylindrical in shape and defines a central zone 22 into which the cleaned gas flows through the filter medium for escape through the outlet 18. In this form of the invention the filter medium 20 may be made of flexible material, preferably a relatively thick felted or matted fibrous material which is capable of withstanding the rubbing action of the reverse jet cleaning device to be described. For example, wool felt may be used.

The filter medium 20 is supported at its upper end as by being turned over an inwardly projecting flange 24 to which it may be clamped by a contractible ring 26. The cover or disc 12 may be clamped down upon the filter medium 20 by screws or studs 28 to afford a gas-tight seal at the upper end of the filter body 10.

The filter medium 20 is backed up by a relatively rigid foraminous supporting frame 30 which may be made of screen wire, expanded sheet metal or the like and which has a diameter somewhat smaller than that of the filter medium 20. The frame 30 is supported by spoke-like arms 32 and 34 secured at their outer ends to the frame 30 and fixed respectively to hubs 36 and 38 freely rotatable on the hollow shaft 40 which will be described in greater detail herein below. Set collars 42 and 44 secured to the shaft 40 serve as vertical supports for the hubs 36 and 38. The frame 30 supports the filter medium against the pressure of the incoming dust-laden gas and is particularly useful, as described in said Patent 2,559,428, in connection with relatively fragile filter medium materials such as light-weight felts, papers and the like.

At its lower end the central zone 22 defined by the filter medium 20 and supporting frame 30 is closed by a disc 46 to which the lower edge of the filter medium 20 may be clamped by a contractible ring 48.

The reverse jet cleaning device includes a vertically disposed elongated blow-tube 50 having a long narrow orifice extending substantially throughout the length thereof in contact with the inner surface of the filter medium 20 as illustrated in full detail in said Patent 2,559,428. The blow-tube 50 is carried on the outer ends of telescopically adjustable hollow arms 52 and 54 which extend over the upper and lower edges respectively of the frame 30 and communicate with the interior of the hollow shaft 40. The blow-tube 50 is thus disposed between the filter medium 20 and the supporting frame 30 for rotation with the hollow shaft 40 to bring the orifice of the blow-tube 50 successively into engagement with substantially the entire inner surface of the filter medium. The filter medium 20 is sufficiently larger in diameter than the frame 30 to permit such disposition and movement of the blow-tube 50, the slack portion of the filter medium bending smoothly over the blow tube all as described in said Patent 2,559,428.

Preferably also the reverse jet cleaning device includes a receiver 56 which comprises a channel-shaped hollow body on the upstream, or high pressure, side of the filter medium 20 which has side walls 58 (only one of which is shown) extending into close proximity with the filter medium 20 on either side of the orifice in blow-tube 50. To this end the receiver 56 is supported at its lower end upon an arm 60 fixed to the lower end of the hollow shaft 40 which extends through a suitable dust-tight bearing 62 passing through the disc 46. Thus when the shaft 40 is rotated, as will be described, receiver 56 will move with the blow tube 50 and will remain opposite the orifice therein so as to isolate the area of the filter medium being cleaned and receive the particles dislodged therefrom. The receiver 56 is open at the bottom and the particles with the reverse jet air are thus guided through the receiver and directly into the hopper 14 without redeposit upon the freshly cleaned surface of the filter medium 20.

The hollow shaft 40 is rotated by a motor 64 belted to a speed reducer 66 having a gear 68 fixed to the low speed shaft thereof and meshing with a gear 70 fixed to the upper end of the shaft 40.

Cleaning gas, usually compressed air, is supplied to the blow-tube 50 through the hollow arms 52 and 54 and hollow shaft 40, by a blower 72 preferably of the positive pressure type. The blower outlet 74 is connected through a hose 76 and hollow tube 78 with the interior of the shaft 40 as described in said Patent 2,559,428.

According to the present invention movement of the blow-tube 50 over the inner surface of the filter medium 20 and the supplying of air thereto are automatically initiated in response to a predetermined increase in the differential in pressure between the high-pressure and low-pressure sides respectively of the filter medium. Furthermore, the volume of air is independently responsive to the magnitude of such differential so as to dislodge accumulated particles at a greater or lesser rate as required.

In the form of invention shown in Figs. 1 through 3, the blower 72 is driven by a variable speed motor 80, the drive-shaft 82 of which carries a pulley 84 connected by a belt 86 to a pulley 88 on the shaft 90 of the blower 72. The variable speed motor 80 is connected by a cable 92 to a starting-box 94. The motor 64, which rotates the blow-tube 50 as described above, also may be connected by a cable 96 to the starting-box 94 or to a separate starting-box if desired or made necessary by the types and capacities of the motors selected. In either event the motors 64 and 80 are both energized and deenergized by the pressure sensitive switch mechanism, now to be described, to start and stop operation of the reverse jet cleaning device in response to a predetermined amount of increase in differential in pressure between the high-pressure and low-pressure sides respectively of the filter medium 20.

The starting box or boxes 94 may be of any suitable type, of which there are many commercially available, designed for magnetic starting and stopping of electric motors. The particular design of the starting box or boxes forms no part of the present invention since they all have certain common features adapting them for my use. The box 94 illustrated herein is provided with a cable 98 which is connected to a source of power and a cable 100 which contains the remote control wiring which operates the magnetic switch or relay within the box 94 for opening and closing the circuit between the motors 64 and 80 and the power line 98.

The remote control cable 100 is connected to a pressure sensitive switch unit 102 mounted upon suitable brackets 104 carried by the filter body 10. The switch unit 102 is connected by a conduit 106 and coupling 108 with the interior of the central zone 22 of the filter and is thus connected with the low-pressure or "clean" side of the filter medium 20. The switch unit 102 is also connected through a conduit 110 and coupling 112 with the interior of the body 10 and is thus connected with the high-pressure or "dirty" side of the filter medium 20.

Referring now to Fig. 3, in which the switch unit 102 is diagrammatically illustrated, it will be observed that the conduit 110 running from the high pressure side of the filter medium 20 is connected with a bellows 114. The conduit 106 running from the low pressure side is connected with a bellows 116. The bellows 114 and 116 are balanced against one another and connected with the insulated end 118 of a switch contact lever 120 by any suitable linkage indicated diagrammatically by the dotted line 122. The linkage 122 is an adjustable one and will differ in detail depending upon the manufacturer from whom the balanced bellows switch is purchased but in any event the lever 118 will be moved toward the left by expansion of bellows 114 and toward the right by expansion of bellows 116. By suitable adjustment of the linkage 122 the bellows 114 and 116 may be balanced with the lever 120 in the central position in which it is illustrated when a predetermined differential in pressure exists between the conduits 110 and 106. As used in the present invention the higher pressure exists in conduit 110 and the lower exists in conduit 106. When the differential in pressure increases the bellows 114 will expand, compressing bellows 116 and swinging lever 120 toward the left and continued increase, to a point predetermined by adjustment of linkage 122, will bring lever 120 into engagement with an electrical contact point 124. If thereafter the differential starts to decrease the bellows 114 will contract and bellows 116 will expand swinging lever 120 away from contact 124. Continued decrease in differential to a point predetermined by adjustment of linkage 122 will swing lever 120 towards the right and into engagement with a contact point 126.

It will be readily apparent that at a predetermined upper limit of differential in pressure between the high pressure and low pressure sides of the filter medium 20 the contacts 120 and 124 will be closed and at a predetermined lower limit the contacts 120 and 126 will be closed and at all intermediate differentials the lever 120 will not be in engagement with either contact 124 or 126. A balanced bellows switch such as just described may be adapted for the starting and stopping of motors 64 and 80 by the use of relays in such manner that the motors will be started upon the closing of contacts 120 and 124 and will continue to operate until the contacts 120 and 126 are closed irrespective of the intervening opening of contacts 120 and 124. One simple arrangement of relays for this purpose is illustrated in Fig. 3.

In said Fig. 3 a self locking, double pole, single throw, normally open relay 128 and a single pole, single throw normally closed relay 130 are wired as follows: Wires 132, 134 and 136, which are the remote control wires for the starting box 94, extend from cable 100 into the switch unit 102. When a circuit is completed through wires 132 and 134 the starting box 94 becomes effective to start and maintain motors 64 and 80 in operation and when these wires are disconnected the motors are deenergized. Wires 134 and 136 are connected within the starting box 94 to a separate source of current, usually a step-down transformer, to energize the windings of relays 128 and 130. Wire 132 is connected through line 138 with a lever 140 of relay 128 which is adapted to engage contact 142 when relay 128 is energized. The contact 142 is connected through line 144 with the wire 134 whereby, upon energization of relay 128, the starting box 94 becomes effective to start motors 64 and 80.

Wire 136 is connected through lines 146 and 148 with the lever 120 of the balanced bellows switch. The contact 124 is connected through lines 150 and 152 with one end of the winding of relay 128. The other end of said winding is connected through line 154 to the lever 156 of relay 130 which engages contact 158 connected through lines 160 and 162 with wire 134. Since relay 130 is normally closed it is apparent that engagement of lever 120 with contact 124 will be effective to energize relay 128 and thus to cause starting of motors 64 and 80.

The relay 128 is provided with locking contacts, comprising lever 164 and contact point 166, which are closed upon energization of relay 128. The lever 164 is connected through line 152 with one end of the winding of relay 128 and the contact 166 is connected through line 168 to the wire 136. Since the other end of the winding is connected through normally closed relay 130 with the wire 134, as described above, it follows that the relay 128 will remain energized so long as relay 130 remains closed irrespective of openings of the contacts 120 and 124. Thus the motors 64 and 80 will remain in operation until relay 130 is opened.

One end of the winding of relay 130 is connected through line 170 and lines 162 and 144 with wire 134 while the other end of said winding is connected through line 172 with contact point 126. Thus when lever 120 is moved into engagement with contact 126 the relay 130 will be energized to open contacts 156 and 158 whereupon the relay 128 is deenergized. The resultant opening of contacts 140 and 142 will open the circuit through wires 132 and 134 to the starting box 94 and the motors 64 and 80 will stop. The simultaneous opening of locking contacts 164 and 166 will permit the relay 128 to remain deenergized until such time as the operation just described is repeated as a result in increase of the differential in pressure between the bellows 114 and 116 to the predetermined amount necessary to cause closing of contacts 120 and 124.

The operation of the apparatus so far described is as follows. Dust-laden gas is supplied to the body 10 of the filter and the dust particles suspended therein will be deposited upon or within the filter medium 20 as the gas flows therethrough into the central zone 22 for escape through outlet 18. The resistance to flow of gas through the filter medium 20 will increase as more particles are detained thereby and such increase will cause a rise in pressure on the high pressure side of the filter medium relative to the pressure on the low pressure side thereof. When the differential in these pressures reaches an amount which has been determined by observation to indicate inefficient operation of the filter the reverse jet cleaning device is put into operation by the pressure sensitive switch mechanism 102 as described above. The filter continues in operation during the cleaning cycle and as cleaning proceeds the accumulation of particles should be so reduced as to reduce the differential in pressure. When the differential reaches an amount determined by observation to indicate that the filter medium is sufficiently clean to permit efficient operation without being overcleaned, as discussed above, the pressure sensitive switch mechanism 102 will be effective to stop the motors 64 and 80 thus ending the cleaning cycle.

As an example the pressure sensitive switch mechanism 102 may be so adjusted as to start the cleaning cycle when the pressure on the high pressure side of the filter medium 20 is four inches of water higher than the low pressure side and to stop the cycle when the differential is three inches of water.

As discussed above, in many installations where wide fluctuations occur in the characteristics of the dust load or atmosphere a given reverse jet capacity may be satisfactory only a part of the time and at other times may be excessive or inadequate. For such installations the capacity of the reverse jet may be appropriately varied by the automatic pressure responsive mechanism now to be described in connection with the modification shown in Figs. 1 through 3.

The variable speed motor 80 may be of any suitable, commercially available type. One widely used type supplied by many manufacturers is provided with a speed control lever projecting from the body of the motor and such type has been illustrated in the drawings although it will be understood that other types may be adapted to the present use by appropriate changes in mechanical linkage and arrangement of parts. In Figs. 1 and 2 the motor 80 is provided with a speed control lever 174 which swings through about seventy degrees between its minimum and maximum speed positions. The lever 174 is connected through a link 176 with an arm 178 of a bell crank lever 180 pivoted at 182 to a bracket 184 secured to the frame of the filter.

A bellows 186 is mounted on a bracket 188 carried by the body 10 of the filter and the movable wall 190 of the bellows is connected through a link 192 with the other arm 194 of bell crank 180. A convenient form of bellows for this purpose is of the hinged type as shown in the drawings although any form of bellows affording a relatively large amount of movement in response to relatively small changes in pressure may be availed of if so desired. The hinged bellows 186 has one of its walls 196 fixed to the bracket 188 so that the other wall 190 will swing clockwise about the hinge 198 upon an increase in pressure within the bellows. The wall 196 is provided with a coupling 200 through which a conduit 202 communicates with the interior of the bellows 186. The conduit 202 communicates at its other end through a coupling 204 with the interior of the body 10 on the high pressure or upstream side of the filter medium 20.

It will be apparent that the bellows 186 will expand and contract with increase and decrease respectively in pressure on the high pressure side of the filter medium 20 and through the linkage 192, 180, and 176 will move the speed control lever 174 on motor 80. The motor 80 and lever 174 are so arranged that clockwise movement of the lever 174 increases the speed of the motor while counterclockwise movement thereof decreases the motor speed. Thus the apparatus just described will increase the motor speed as the bellows 186 expands and decrease it as the bellows contracts in response to changes in pressure on the high pressure side of the filter medium 20. If so desired the amount of speed change produced by a given change in pressure may be varied. For example the link 192 may be inserted into any one of several apertures 206 arranged different distances from the pivot 182 of bell crank 180.

Preferably the bellows 186 is so designed that it will remain collapsed or only slightly expanded as the pressure within filter body 10 rises to the point at which the cleaning cycle is initiated by pressure sensitive switch mechanism 102 and will expand quite rapidly with further increase in pressure. The hinged wall 190, for example, may be weighted to move only when a given pressure is reached and the spring effect of the bellows may be relatively light so that the bellows is very sensitive in a narrow range. Thus, ordinarily, the motor 80 will start at minimum speed when a cleaning cycle is initiated. If such volume of air from blower 72 is effective to remove enough of the accumulated particles and thus to increase porosity so that the pressure on the upstream side of the filter medium starts to decrease, the speed of motor 80 will remain at minimum until the cycle is terminated. If the condition or volume of the dust load at the time of initiation of a cleaning cycle is such that the reverse jet does not remove the accumulation with sufficient rapidity the pressure on the upstream side will continue to rise and the bellows 186 will expand to increase the speed of motor 80. Such increase will continue, within the selected limits of the apparatus, so long as continued increase in upstream pressure indicates the need for greater jet capacity.

Preferably the minimum of starting speed of the blower motor 80 will be so set that the jet capacity will be below that required under average conditions. In this manner overcleaning of any portion of the filter medium may be avoided under below average conditions. As stated above, the avoidance of overcleaning makes it possible to restore the filter medium to substantially ideal density or porosity and to avoid operation at low efficiency as regards small particle retention during as well as at the end of each cleaning cycle.

Figure 4:
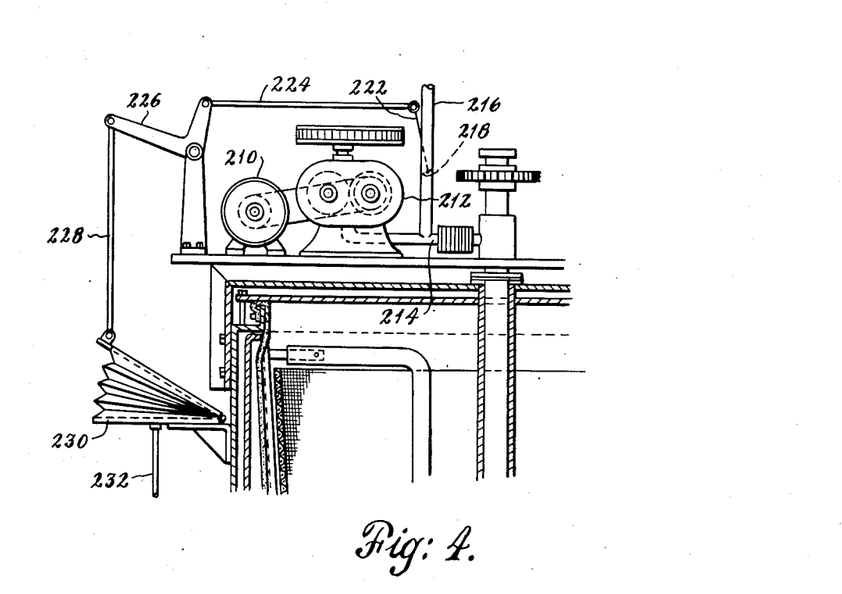
Fig. 4 is a fragmentary elevational view of a bleeder valve and control apparatus therefor which may be used with the filter shown in Fig. 1.
Figure 5:
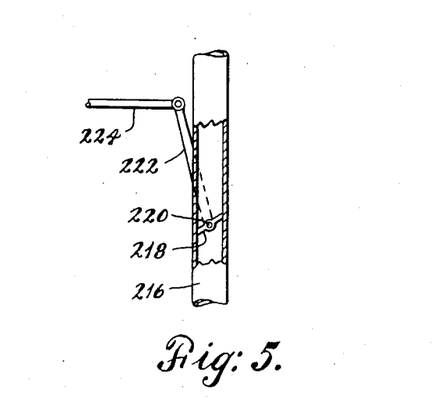
Fig. 5 is an enlarged detail view of the parts shown in Fig. 4.

In Figs. 4 and 5 there is shown a modified system for modulating the intensity of the counter-flow or jet of cleaning air. In this embodiment of the invention the pressure of the cleaning air is modified by bleeding a controlled amount of air from the supply line running to the reverse jet, for example. Thus a motor 210 is provided and such motor may be a constant speed motor as contrasted with the variable speed motors provided in the other forms of this invention. The motor 210 drives a positive pressure blower 212 which discharges air under pressure to a line 214 which may correspond, for example, with the line 74 in the form of the invention shown in Fig. 1. A bleed-off line 216 communicates with the line 214 at one end and may discharge to the atmosphere at the other end. The valve 218 is fixed on a pivot 220 in the line 216. The valve 218 is shown as a simple butterfly valve and in Figs. 4 and 5 it is shown in a position wherein it closes the line 216. The pivot 220 has secured thereto a lever 222 which is connected by a link 224 to a bell crank 226 which is in turn connected by link 228 with a bellows 230. The bellows 230 is connected by a line 232 to the high pressure side of the filter medium with which the apparatus may be associated.

In the position of the parts shown in Figs. 4 and 5, it is assumed that the differential in pressure between the high pressure and low pressure sides of the filter medium is at a maximum wherein the bellows 230 is expanded and has operated the linkage 228, 224, etc., so as to close the valve 218. Under these conditions the full output of the blower 210 will pass through the line 214 to be used in cleaning the filter. When the differential in pressure is less, as would be the case when the density of the filter medium is not rising so rapidly, the bellows 230 will be expanded to a lesser extent, whereupon the valve 218 will be opened to an extent proportionate to the degree of extension of the bellows 230, all as explained hereinabove in connection with the control of variable speed motors. It will be apparent that movement of the valve 218 will result in a greater or lesser amount of high pressure air escaping through the line 216 to the atmosphere. Consequently the valve 218 is effective to vary the pressure and volume of air delivered to the reverse jet cleaning device with which this form of apparatus is associated.

As explained above, it is preferred that the apparatus be set up so that a substantial amount of air will be bled through the line 216 under normal conditions to provide a reserve capacity for cleaning the filter under more difficult conditions which might arise. As in the other form of this invention, it is preferred that the motor 210 be energized only at such times as cleaning action is required.

For purposes of illustration, there has been shown a simple butterfly valve 218. It will be readily appreciated that other forms of valves, such as sliding diaphragm valves or valves specifically designed for linear control of the flow of air from the line 216 may be used in order to achieve accurate and smooth control. The particular form of valve forms no part of the present invention which is directed primarily to the broader aspects of the provision of modulating apparatus to control the degree of cleaning and thus the degree of porosity maintained in a filter media of various types.

It will be appreciated that the present invention may be adapted not only to counterflow or reverse jet filters which are on the discharge side of a fan but also to those on which a suction fan draws the dust-laden gas through the filter. In such cases the bellows for modulating the cleaning air supply may be enclosed and located on the low pressure side. In some cases the suction may be sufficient to enable the use of air at atmospheric pressure as the cleaning air in which event the supply may be modulated by bellows which control an adjustable inlet valve for such cleaning air. Therefore, while detailed disclosure has been made of preferred forms of the present invention, it will be understood that modifications and variations of the suggested and other types may be resorted to within the scope of the present invention.

I claim:

1. In a filter for separating particles from gas the combination of a gas-pervious filter medium, means for supplying particle-laden gas to one side of said filter medium at a gaseous pressure higher than that on the other side of said filter medium whereby said filter medium will retain particles from said gas, said filter medium having a definite particle-detaining efficiency and a definite porosity causing a differential between gaseous pressures on opposite sides thereof when installed in said filter in new, unused condition and having a slightly reduced porosity and markedly higher particle-detaining efficiency after the accumulation by said filter medium of a predetermined quantity of particles retained thereby in use, said slightly reduced porosity causing an increase in said differential to a predetermined differential, means for supplying air under gaseous pressure higher than that on the high pressure side of said filter medium, means for directing said air through said filter medium from the low pressure side to the high pressure side thereof to dislodge and rearrange particles retained by said filter medium, and means for establishing and maintaining the volume of air directed by said air supplying means through said filter medium at a predetermined value which varies directly with changes in differential above said predetermined differential, said last named means being operatively responsive to said changes in said differential whereby said air supplying means is effective to dislodge and rearrange substantially only that portion of said accumulated particles which causes increase in said differential above said predetermined differential.

2. In a filter for separating particles from gas the combination of a gas-pervious filter medium, means for supplying particle-laden gas to one side of said filter medium at a gaseous pressure higher than that on the other side of said filter medium whereby said filter medium will retain particles from said gas, said filter medium having a definite particle-detaining efficiency and a definite porosity causing a differential between gaseous pressures on opposite sides thereof when installed in said filter in new, unused condition and having a slightly reduced porosity and markedly higher particle-detaining efficiency after the accumulation by said filter medium of a predetermined quantity of particles retained thereby in use, said slightly reduced porosity causing an increase in said differential to a predetermined differential, means for supplying air under gaseous pressure higher than that on the high pressure side of said filter medium, said air supplying means comprising a compressor and a variable speed electric motor for driving said compressor, means for directing said air through said filter medium from the low pressure side to the high pressure side thereof to dislodge and rearrange particles retained by said filter medium, and means for establishing and maintaining the volume of air directed by said air supplying means through said filter medium at a predetermined value which varies directly with changes in differential above said predetermined differential, said last named means being operatively responsive to said changes in said differential to vary the speed of said variable speed motor whereby said air supplying means is effective to dislodge and rearrange substantially only that portion of said accumulated particles which causes increase in said differential above said predetermined differential.

3. In a filter for separating particles from gas the combination of a gas-pervious filter medium, means for supplying particle-laden gas to one side of said filter medium at a gaseous pressure higher than that on the other side of said filter medium whereby said filter medium will retain particles from said gas, said filter medium having a definite particle-detaining efficiency and a definite porosity causing a differential between gaseous pressures on opposite sides thereof when installed in said filter in new, unused condition and having a slightly reduced porosity and markedly higher particle-detaining efficiency after the accumulation by said filter medium of a predetermined quantity of particles retained thereby in use, said slightly reduced porosity causing an increase in said differential to a predetermined differential, means for supplying air under gaseous pressure higher than that on the high pressure side of said filter medium, means for directing said air through said filter medium from the low pressure side to the high pressure side thereof to dislodge and rearrange particles retained by said filter medium, an adjustable valve for diverting varying quantities of air away from said directing means, and means for establishing and maintaining the volume of air directed by said air supplying means through said filter medium at a predetermined value which varies directly with changes in differential above said predetermined differential, said last named means being operatively responsive to said changes in said differential to adjust said valve whereby said air supplying means is effective to dislodge and rearrange substantially only that portion of said accumulated particles which causes increase in said differential above said predetermined differential.

4. In a filter for separating particles from gas the combination of a gas-pervious filter medium, means for supplying particle-laden gas to one side of said filter medium at a gaseous pressure higher than that on the other side of said filter medium whereby said filter medium will retain particles from said gas, said filter medium having a definite particle-detaining efficiency and a definite porosity causing a differential between gaseous pressures on opposite sides thereof when installed in said filter in new, unused condition and having a slightly reduced porosity and markedly higher particle-detaining efficiency after the accumulation by said filter medium of a predetermined quanity of particles retained thereby in use, said slightly reduced porosity causing an increase in said differential to a predetermined differential, a hollow member having an orifice with an area consisting of a small fraction of the area of said filter medium, means for moving said hollow member to progressively bring said orifice into engagement with substantially the entire area of said filter medium on the low pressure side thereof, means for supplying air under gaseous pressure higher than that on the high pressure side of said filter medium to said hollow member for discharge through said orifice and said filter medium to dislodge and rearrange particles retained by said filter medium, and means for establishing and maintaining the volume of air directed by said air supplying means through said filter medium at a predetermined value which varies directly with changes in differential above said predetermined differential, said last named means being operatively responsive to said changes in said differential whereby said air supplying means is effective to dislodge and rearrange substantially only that portion of said accumulated particles which causes increase in said differential above said predetermined differential.

5. In a filter for separating particles from gas the combination of a gas-pervious medium, means for supplying particle-laden gas to one side of said filter medium at a gaseous pressure higher than that on the other side of said filter medium whereby said filter medium will retain particles from said gas, said filter medium having a definite particle-detaining efficiency and a definite porosity causing a differential between gaseous pressures on opposite sides thereof when installed in said filter in new, unused condition and having a slightly reduced porosity and markedly higher particle-detaining efficiency after the accumulation by said filter medium of a predetermined quantity of particles retained thereby in use, said slightly reduced porosity causing an increase in said differential to a predetermined differential, normally inactive means for supplying air under gaseous pressure higher than that on the high pressure side of said filter medium, means for directing said air through said filter medium from the low pressure side to the high pressure side thereof to dislodge and rearrange particles retained by said filter medium, means responsive to a predetermined further increase in said differential above said predetermined differential for initiating operation of said normally inactive air supplying means, and means for establishing and maintaining the volume of air directed by said air supplying means through said filter medium at a predetermined value which varies directly with changes in differential above said predetermined differential, said last named means being operatively responsive to said changes in said differential whereby said air supplying means is effective to dislodge and rearrange substantially only that portion of said accumulated particles which causes increase in said differential above said predetermined differential.

6. In a filter for separating particles from gas the combination of a gas-pervious filter medium, means for supplying particle-laden gas to one side of said filter medium at a gaseous pressure higher than that on the other side of said filter medium whereby said filter medium will retain particles from said gas, said filter medium having a definite particle-detaining efficiency and a definite porosity causing a differential between gaseous pressures on opposite sides thereof when installed in said filter in new, unused condition and having a slighty reduced porosity and markedly higher particle-detaining efficiency after the accumulation by said filter medium of a predetermined quanity of particles retained thereby in use, said slightly reduced porosity causing an increase in said differential to a predetermined differential, normally inative means for supplying air under gaseous pressure higher than that on the high pressure side of said filter medium, means for directing said air through said filter medium from the low pressure side to the high pressure side thereof to dislodge and rearrange particles retained by said filter medium, means responsive to a predetermined further increase in said differential above said predetermined differential for initiating operation of said normally inactive air supplying means, means for establishing and maintaining the volume of air directed by said air supplying means through said filter medium at a predetermined value which varies directly with changes in differential above said predetermined differential, said last named means being operatively responsive to said changes in said differential whereby said air supplying means is effective to dislodge and rearrange substantially only that portion of said accumulated particles which causes increase in said differential above said predetermined differential, and means responsive to return of said differential substantially to said predetermined differential for terminating operation of said air-supplying means.

7. In a filter for separating particles from gas the combination of a gas-pervious filter medium, means for supplying particle-laden gas to one side of said filter medium at a gaseous pressure higher than that on the other side of said filter medium whereby said filter medium will retain particles from said gas, said filter medium having a definite particle-detaining efficiency and a definite porosity causing a differential between gaseous pressures on opposite sides thereof when installed in said filter in new, unused condition and having a slightly reduced porosity and markedly higher particle-detaining efficiency after the accumulation by said filter medium of a predetermined quantity of particles retained thereby in use, said slightly reduced porosity causing an increase in said differential to a predetermined differential, normally inactive means for supplying air under gaseous pressure higher than that on the high pressure side of said filter medium, said air supplying means comprising a compressor and a variable speed electric motor for driving said compressor, means for directing said air through said filter medium from the low pressure side to the high pressure side thereof to dislodge and rearrange particles retained by said filter medium, means responsive to a predetermined further increase in said differential above said predetermined differential for initiating operation of said normally inactive air supplying means, and means for establishing and maintaining the volume of air directed by said air supplying means through said filter medium at a predetermined value which varies directly with changes in differential above said predetermined differential, said last named means being operatively responsive to said changes in said differential to vary the speed of said variable speed motor whereby said air supplying means is effective to dislodge and rearrange substantially only that portion of said accumulated particles which causes increase in said differential above said predetermined differential.

8. In a filter for separating particles from gas the combination of a gas-pervious filter medium, means for supplying particle-laden gas to one side of said filter medium at a gaseous pressure higher than that on the other side of said filter medium whereby said filter medium will retain particles from said gas, said filter medium having a definite particle-detaining efficiency and a definite porosity causing a differential betwen gaseous pressures on opposite sides thereof when installed in said filter in new, unused condition and having a slightly reduced porosity and markedly higher particle-detaining efficiency after the accumulation by said filter medium of a predetermined quantity of particles retained thereby in use, said slightly reduced porosity causing and increase in said differential to a predetermined differential, normally inactive means for supplying air under gaseous pressure higher than that on the high pressure side of said filter medium, means for directing said air through said filter medium from the low pressure side to the high pressure side thereof to dislodge and rearrange particles retained by said filter medium, an adjustable valve for diverting varying quantities of air away from said directing means, means responsive to a predetermined further increase in said differential above said predetermined differential for initiating operation of said normally inactive air supplying means, and means for establishing and maintaining the volume of air directed by said air supplying means through said filter medium at a predetermined value which varies directly with changes in differential above said predetermined differential, said last named means being operatively responsive to said changes in said differential to adjust said valve whereby said air supplying means is effective to dislodge and rearrange substantially only that portion of said accumulated particles which causes increase in said differential above said predetermined differential.

9. In a filter for separating particles from gas the combination of a gas-pervious filter medium, means for supplying particle-laden gas to one side of said filter medium at a gaseous pressure higher than that on the other side of said filter medium whereby said filter medium will retain particles from said gas, said filter medium having a definite particle-detaining efficiency and a definite porosity causing a differential between gaseous pressures on opposite sides thereof when installed in said filter in new, unused condition and having a slightly reduced porosity and markedly higher particle-detaining efficiency after the accumulation by said filter medium of a predetermined quantity of particles retained thereby in use, said slightly reduced porosity causing an increase in said differential to a predetermined differential, a hollow member having an orifice with an area constituting a small fraction of the area of said filter medium, means for moving said hollow member to progressively bring said orifice into engagement with substantially the entire area of said filter medium on the low pressure side thereof, normally inactive means for supplying air under gaseous pressure higher than that on the high pressure side of said filter medium to said hollow member for discharge through said orifice and said filter medium to dislodge and rearrange particles retained by said filter medium, means responsive to a predetermined further increase in said differential above said predetermined differential for initiating operation of said normally inactive air supplying means, and means for establishing and maintaining the volume of air directed by said air supplying means through said filter medium at a predetermined value which varies directly with changes in differential above said predetermined differential, said last named means being operatively responsive to said changes in said differential whereby said air supplying means is effective to dislodge and rearrange substantially only that portion of said accumulated particles which causes increase in said differential above said predetermined differential.

References Cited in the file of this patent

UNITED STATES PATENTS

| | | |
|---|---|---|
| 1,904,973 | Smellie | Apr. 18, 1933 |
| 1,947,447 | Brassert et al. | Feb. 20, 1934 |
| 2,368,787 | Skinner | Feb. 6, 1945 |
| 2,451,073 | Cowherd | Oct. 12, 1948 |
| 2,495,635 | Hersey | Jan. 24, 1950 |
| 2,559,428 | Hersey | July 3, 1951 |
| 2,576,656 | Wallin | Nov. 27, 1951 |

U. S. DEPARTMENT OF COMMERCE
PATENT OFFICE

CERTIFICATE OF CORRECTION

Patent No. 2,827,128     Henry J. Hersey, Jr.     March 18, 1958

It is hereby certified that error appears in the printed specification of the above numbered patent requiring correction and that the said Letters Patent should read as corrected below.

Column 11, line 31, after "gas-pervious" insert -- filter --; column 12, lines 3 and 4, for "inative" read -- inactive --; column 13, line 1, for "and" read -- an --.

Signed and sealed this 3rd day of June 1958.

(SEAL)

Attest:
KARL H. AXLINE

Attesting Officer

ROBERT C. WATSON
Commissioner of Patents